United States Patent
Takemura et al.

(10) Patent No.: US 11,402,836 B2
(45) Date of Patent: Aug. 2, 2022

(54) SERVER DEVICE, TERMINAL DEVICE, COMMUNICATION SYSTEM, INFORMATION RECEPTION METHOD, INFORMATION TRANSMISSION METHOD, INFORMATION RECEPTION PROGRAM, INFORMATION TRANSMISSION PROGRAM, RECORDING MEDIUM, AND DATA STRUCTURE

(71) Applicant: PIONEER CORPORATION, Tokyo (JP)

(72) Inventors: Itaru Takemura, Kawagoe (JP); Hiroshi Nagata, Kawagoe (JP); Makoto Matsumaru, Kawagoe (JP); Kyoichi Terao, Kawagoe (JP); Akira Shimizu, Kawagoe (JP)

(73) Assignee: PIONEER CORPORATION, Tokyo (JP)

( * ) Notice: Subject to any disclaimer, the term of this patent is extended or adjusted under 35 U.S.C. 154(b) by 184 days.

(21) Appl. No.: 16/499,195

(22) PCT Filed: Feb. 26, 2018

(86) PCT No.: PCT/JP2018/006934
§ 371 (c)(1),
(2) Date: Sep. 27, 2019

(87) PCT Pub. No.: WO2018/180097
PCT Pub. Date: Oct. 4, 2018

(65) Prior Publication Data
US 2020/0249670 A1    Aug. 6, 2020

(30) Foreign Application Priority Data
Mar. 29, 2017 (JP) .............................. JP2017-066227

(51) Int. Cl.
*G05D 1/00* (2006.01)
*G08G 1/09* (2006.01)

(52) U.S. Cl.
CPC ........... *G05D 1/0027* (2013.01); *G05D 1/005* (2013.01); *G05D 1/0022* (2013.01); *G08G 1/09* (2013.01)

(58) Field of Classification Search
CPC .... G05D 1/0027; G05D 1/0022; G05D 1/005; G08G 1/09; G08G 1/0112; G08G 1/096775; G01C 21/3841
See application file for complete search history.

(56) References Cited

U.S. PATENT DOCUMENTS

2011/0130894 A1    6/2011  Kim et al.
2015/0066282 A1    3/2015  Yopp
(Continued)

FOREIGN PATENT DOCUMENTS

JP    2017004445 A    1/2017
WO   2014119196 A1   8/2014
(Continued)

OTHER PUBLICATIONS

Extended European Search Report dated Feb. 25, 2021 in EP Patent Application No. 18777132.4.
(Continued)

*Primary Examiner* — Anshul Sood
(74) *Attorney, Agent, or Firm* — Procopio, Cory, Hargreaves & Savitch LLP

(57) ABSTRACT

A server device efficiently acquires information of a surrounding area of a movable body for updating map information while suppressing communication load. Condition information indicating a condition of autonomous driving is received from a first movable body capable of autonomous driving based on a state of a surrounding area of the first (Continued)

movable body and a map, and a request for state information is transmitted to a second movable body capable of transmitting the state information indicating a state of a place where the first movable body has moved, and when the received condition information indicates that the autonomous driving has been possible, transmission of the request is prevented.

16 Claims, 5 Drawing Sheets

(56) References Cited

U.S. PATENT DOCUMENTS

| | | | |
|---|---|---|---|
| 2016/0028824 A1 | 1/2016 | Stenneth et al. | |
| 2016/0364921 A1* | 12/2016 | Iyoda | G07C 5/0841 |
| 2017/0232974 A1* | 8/2017 | Nishida | B60W 50/082 |
| | | | 701/24 |
| 2018/0023966 A1* | 1/2018 | Iwai | G08G 1/0145 |
| | | | 701/423 |
| 2018/0038701 A1 | 2/2018 | Iwai et al. | |
| 2018/0113474 A1 | 4/2018 | Koda et al. | |
| 2018/0211520 A1* | 7/2018 | Offenhaeuser | G08G 1/0141 |
| 2018/0231978 A1* | 8/2018 | Li | G05D 1/0055 |

FOREIGN PATENT DOCUMENTS

| | | | | |
|---|---|---|---|---|
| WO | 2016139748 A1 | 9/2016 | | |
| WO | 2016152874 A1 | 9/2016 | | |
| WO | WO-2016139748 A1 * | 9/2016 | | G01C 21/26 |

OTHER PUBLICATIONS

Sung et al., "Autonomous Vehicle Guidance System with Infrastructure" 2013, 7th International Conference on Signal Processing and Communication Systems, IEEE (Dec. 16, 2013) pp. 1-6.

International Search Report for related International Application No. PCT/JP2018/006934, dated Apr. 17, 2018; English translation of ISR provided; 3 pages.

* cited by examiner

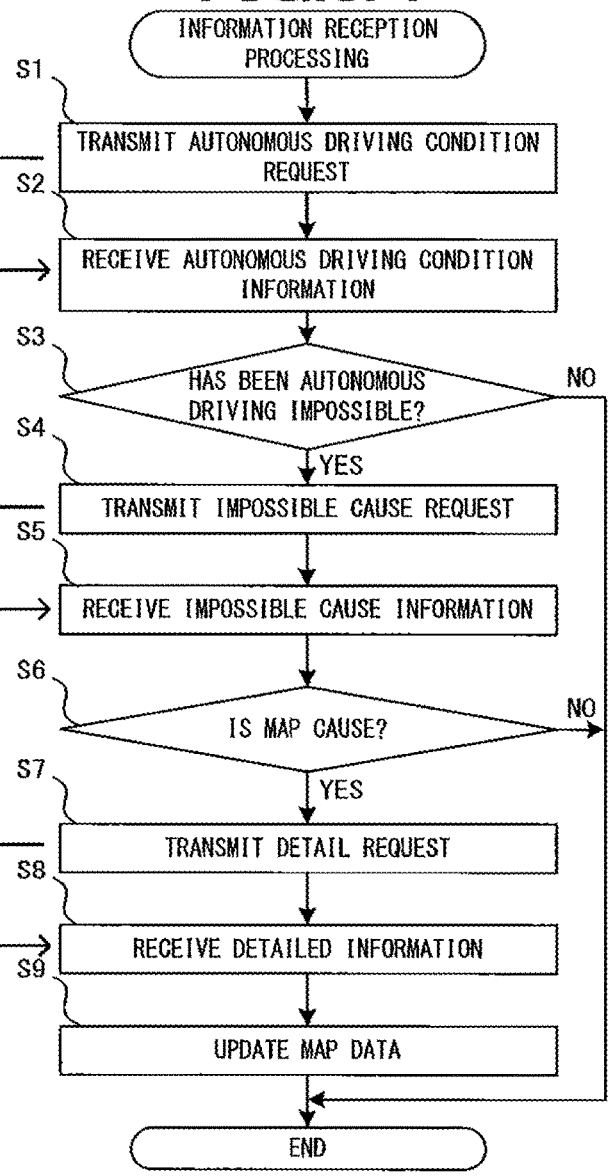

SERVER DEVICE, TERMINAL DEVICE, COMMUNICATION SYSTEM, INFORMATION RECEPTION METHOD, INFORMATION TRANSMISSION METHOD, INFORMATION RECEPTION PROGRAM, INFORMATION TRANSMISSION PROGRAM, RECORDING MEDIUM, AND DATA STRUCTURE

TECHNICAL FIELD

The present application belongs to a technical field of a communication system in which information of a surrounding area of a movable body is transmitted from the movable body to a server device for maintenance of map information used for autonomous driving of the movable body.

BACKGROUND ART

In recent years, research and development of vehicles that perform autonomous driving based on a three-dimensional detailed map information using, for example, normal distribution transform (NDT), the occupancy grid map (OGM), or the like, have been actively performed. For example, a sensor such as laser imaging detection and ranging (LIDAR) detects, with high precision, a relative position from a movable body and shape of an object present in the surrounding area of a vehicle that has been equipped with the sensor while the vehicle is running, and map information is generated based on the information detected by this sensor. A vehicle that performs autonomous driving compares the information detected by the sensor mounted on this vehicle, to map information to estimate the current position of the vehicle, and control an accelerator, a brake, a steering, and the like.

Patent Literature 1 discloses that, when a behavior of a vehicle due to autonomous driving or the like is detected, a vehicle-mounted device mounted on the vehicle transmits a transmission signal including a behavior detection notification signal indicating that the behavior has been detected to a server device, and when the server device determines that a predetermined condition is satisfied in response to the reception of the transmission signal, the server device transmits an upload request for vehicle information representing a condition of the vehicle to the vehicle-mounted device.

CITATION LIST

Patent Literature

Patent Literature 1: JP 2017-4445 A

SUMMARY OF INVENTION

Technical Problem

As actual ground state may change frequently, it is desirable to update map information in response to this change. Therefore, it is conceivable that a general vehicle transmits information detected by a sensor mounted on the vehicle to a server device while running, and the server device updates map information based on the received information. However, if the information detected by the sensor is constantly transmitted to the server device, there is a problem that the communication load becomes enormous.

Patent Literature 1 discloses a technology for suppressing communication load of transmitting information representing the condition of a vehicle, but does not mention at all suppressing of communication load of transmitting information of the surrounding area of the vehicle.

The present application has been made in view of the above points, and an example of the problem is to provide a server device, a terminal device, a communication system, an information reception method, an information transmission method, an information reception program, an information transmission program, a recording medium, and a data structure in which the server device can efficiently acquire information of a surrounding area of a movable body for updating map information while suppressing communication load.

Solution to Problem

In order to solve the above problem, the invention is a server device comprising: a condition reception unit that receives, from a first movable body capable of autonomous driving based on a state of a surrounding area of the first movable body and a map, condition information indicating a condition of the autonomous driving; and a request unit that transmits, to a second movable body capable of transmitting state information indicating a state of a place where the first movable body has moved, a request for the state information, wherein, when the received condition information indicates that the autonomous driving has been possible, the request unit prevents transmission of the request.

The invention is a terminal device capable of communicating with the server device, and mounted on one movable body included in a plurality of movable bodies capable of autonomous driving based on a state of a surrounding area of a movable body and a map, the terminal device comprising: an acquisition unit that acquires condition information indicating a condition of autonomous driving of the one movable body; and a condition transmission unit that transmits the acquired condition information to the server device.

The invention is a communication system comprising: a server device comprising a condition reception unit that receives, from a first movable body capable of autonomous driving based on a state of a surrounding area of the first movable body and a map, the condition information indicating a condition of the autonomous driving, a request unit that transmits, to a second movable body capable of transmitting state information indicating a state of a place where the first movable body has moved, a request for the state information, and a state reception unit that receives the state information from the second movable body; a first terminal device comprising an acquisition unit that acquires the condition information indicating the condition of the autonomous driving of the first movable body, and a condition transmission unit that transmits the acquired condition information to the server device; and a second terminal device comprising a reception unit that receives the request from the server device, and a surrounding area transmission unit that, when the request is received, transmits to the server device the state information indicating a state of a surrounding area of the second movable body in the place where the first movable body has moved, wherein, when the received condition information indicates that the autonomous driving is possible, the request unit prevents transmission of the request.

The invention is an information reception method executed by a computer, the information reception method comprising: a condition reception step of receiving, from a first movable body capable of autonomous driving based on a state of a surrounding area of the first movable body and a map, condition information indicating a condition of the autonomous driving; and a request step of transmitting, to a second movable body capable of transmitting state information indicating a state of a place where the first movable body has moved, a request for the state information, wherein, when the received condition information indicates that the autonomous driving has been possible, transmission of the request is prevented in the request step.

The invention is an information transmission method executed by a computer of a terminal device capable of communicating with the server device, and mounted on one movable body included in a plurality of movable bodies capable of autonomous driving based on a state of a surrounding area of a movable body and a map, the information transmission method comprising: an acquisition step of acquiring condition information indicating a condition of autonomous driving of the one movable body; and a condition transmission step of transmitting the acquired condition information to the server device.

The invention is an information reception program that causes a computer to function as the server device.

The invention is an information transmission program that causes a computer to function as the terminal device.

The invention is a recording medium that records the information reception program in a computer readable manner.

The invention is a recording medium that records the information transmission program in a computer readable manner.

The invention is a data structure of condition information indicating a condition of autonomous driving transmitted from a first movable body capable of the autonomous driving based on a state of a surrounding area of the first movable body and a map to a server device, wherein the condition information includes position information indicating a position where the first movable body moves, and possible/impossible information indicating whether the autonomous driving has been possible in the position, and the possible/impossible information is used by the server device to control transmission of a request for cause information to a third movable body capable of transmitting the cause information indicating a cause for which the autonomous driving in the position indicated by the position information has been impossible.

The invention is a data structure of the cause information transmitted to the server device from the third movable body that has received the request for the cause information transmitted from the server device, wherein the cause information includes (i) reason information indicating a reason for which the autonomous driving is impossible, and (ii) position information indicating a predetermined position when there is a difference between a state of a surrounding area of the third movable body acquired by a sensor mounted on the third movable body in the predetermined position, and a state indicated for the predetermined position by a map used by the third movable body for the autonomous driving, and the reason information is used by the server device to control transmission of a request for state information to the second movable body capable of transmitting the state information indicating a state of the position indicated by the position information.

BRIEF DESCRIPTION OF DRAWINGS

FIG. 5A is a flowchart illustrating an example of information reception processing according to the example. FIG. 5B is a flowchart illustrating an example of autonomous driving condition information transmission processing according to the example. FIG. 5C is a flowchart illustrating an example of impossible cause information transmission processing according to the example. FIG. 5D is a flowchart illustrating an example of detailed information transmission processing according to the example.

DESCRIPTION OF EMBODIMENTS

Figure 1:
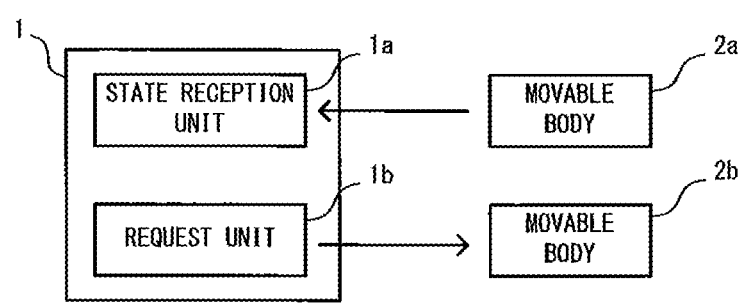
FIG. 1 is a block diagram illustrating an example of a schematic configuration of a server device according to an embodiment.

Next, an embodiment for carrying out the present application will be described with reference to FIG. 1. FIG. 1 is a block diagram illustrating an example of a schematic configuration of a server device according to an embodiment.

As illustrated in FIG. 1, a server device 1 according to the embodiment includes a condition reception unit 1*a* and a request unit 1*b*. The server device 1 can communicate with the movable bodies 2*a* and 2*b*. Examples of movable bodies 2*a* and 2*b* include an automobile, a vehicle such as a motorcycle, an airplane such as a drone (or unmanned aerial vehicle), and the like. The movable body 2*a* can perform autonomous driving based on a state of the surrounding area of the movable body 2*a* and a map. The movable body 2*b* is at least capable of acquiring the state in the surrounding area of the movable body 2*b*.

The condition reception unit 1*a* receives condition information indicating the condition of the autonomous driving from the movable body 2*a*.

The request unit 1*b* transmits a request for the state information to the movable body 2*b* capable of transmitting state information indicating the state of a place where the movable body 2*a* has moved.

Here, when the condition information received by the condition reception unit 1*a* indicates that the autonomous driving has been possible, the request unit 1*b* prevents the transmission of the request for the state information.

As described above, according to the operation of the server device 1 according to the embodiment, the movable body 2*b* does not transmit, to the server device 1, state information of a place where autonomous driving of the movable body 2*a* has been possible. It is conceivable that, for the place where the autonomous driving has been possible, there is basically no problem with the map used for the autonomous driving. Accordingly, since transmission of state information unnecessary for updating map information is prevented, the server device 1 can efficiently acquire information of the surrounding area of the movable body for updating map information while suppressing communication load.

EXAMPLES

Figure 2:
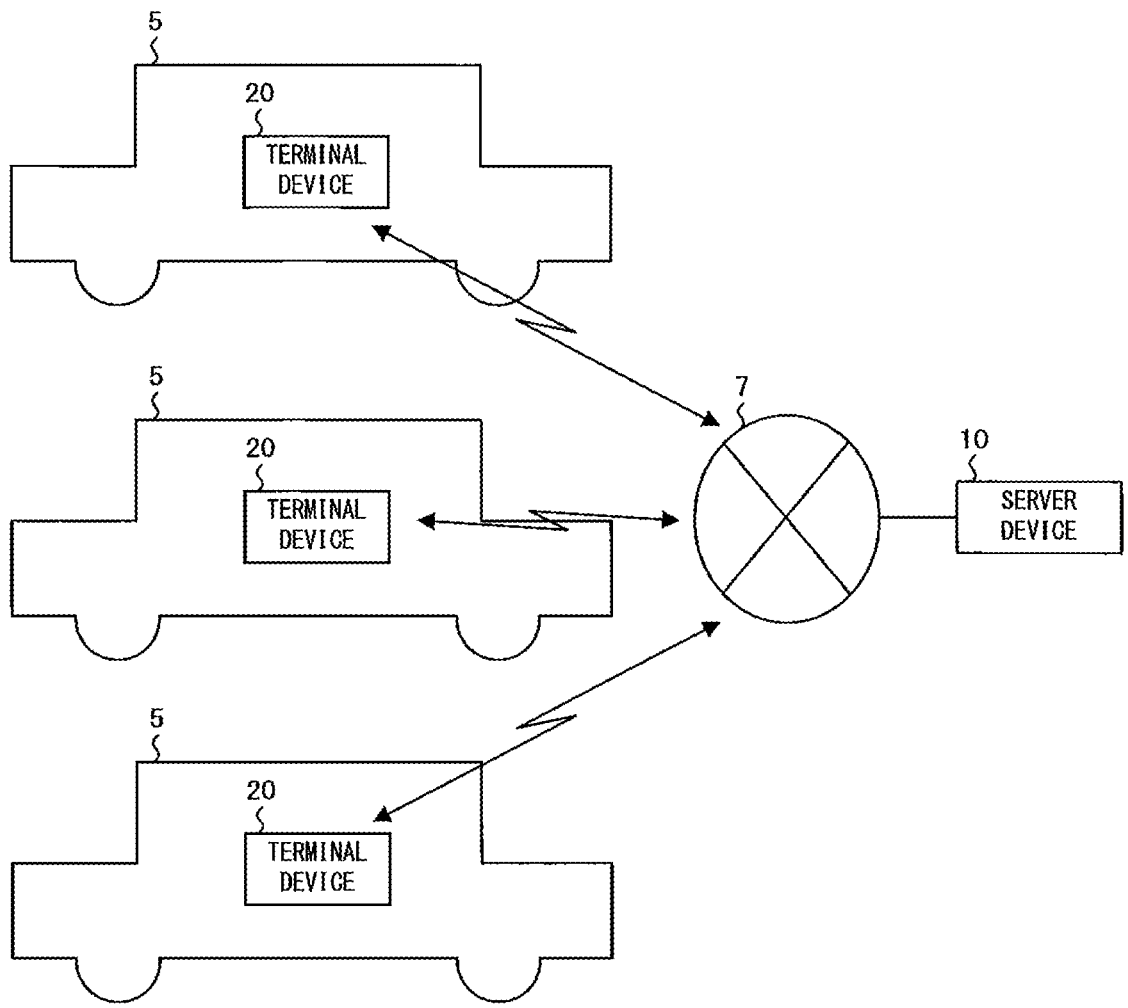
FIG. 2 is a block diagram illustrating an example of a schematic configuration of a communication system according to an example.
Figure 3A:
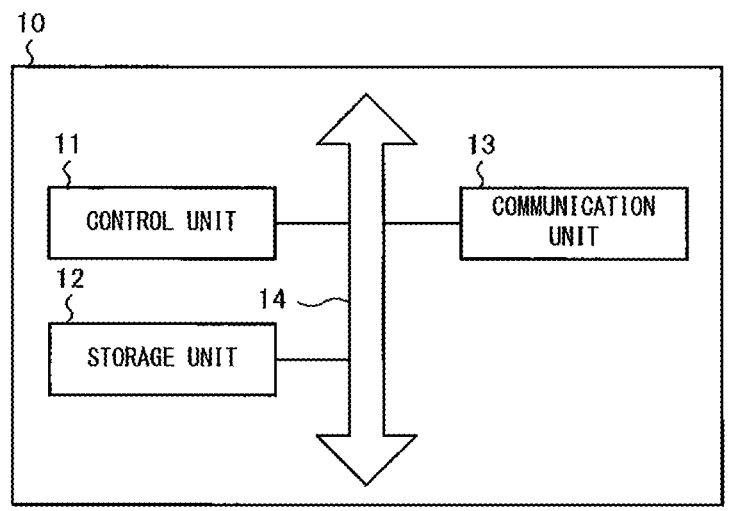
FIG. 3A is a block diagram illustrating an example of a schematic configuration of a server device according to the example.
Figure 3B:
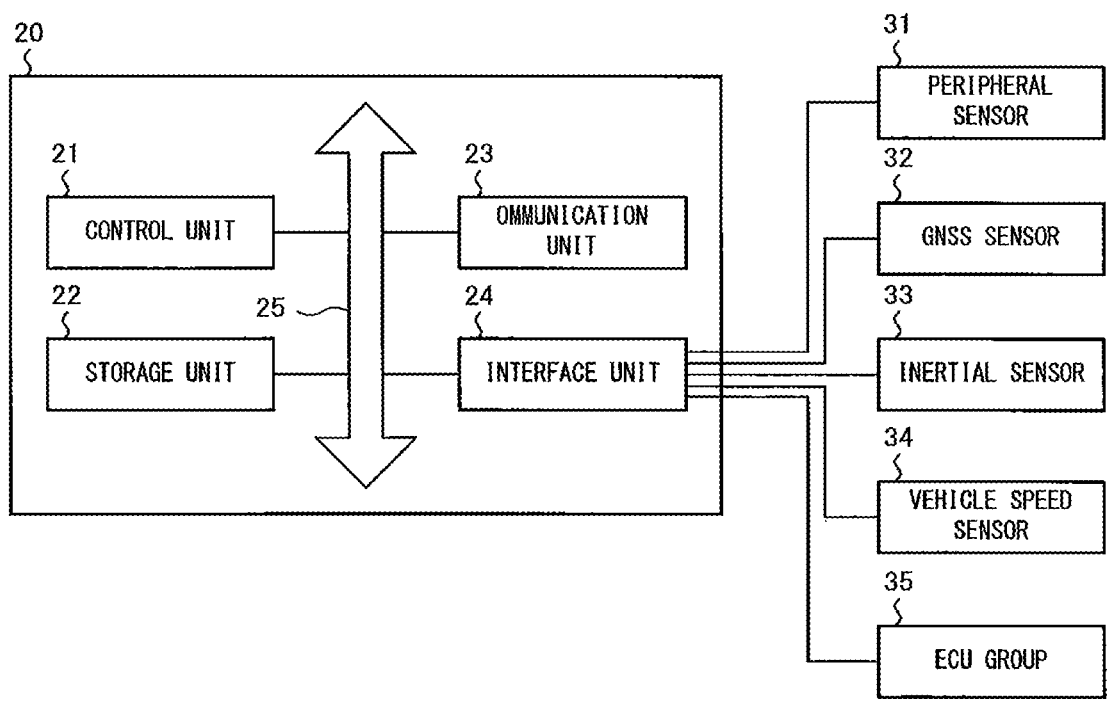
FIG. 3B is a block diagram illustrating an example of a schematic configuration of a terminal device according to the example.
Figure 4:
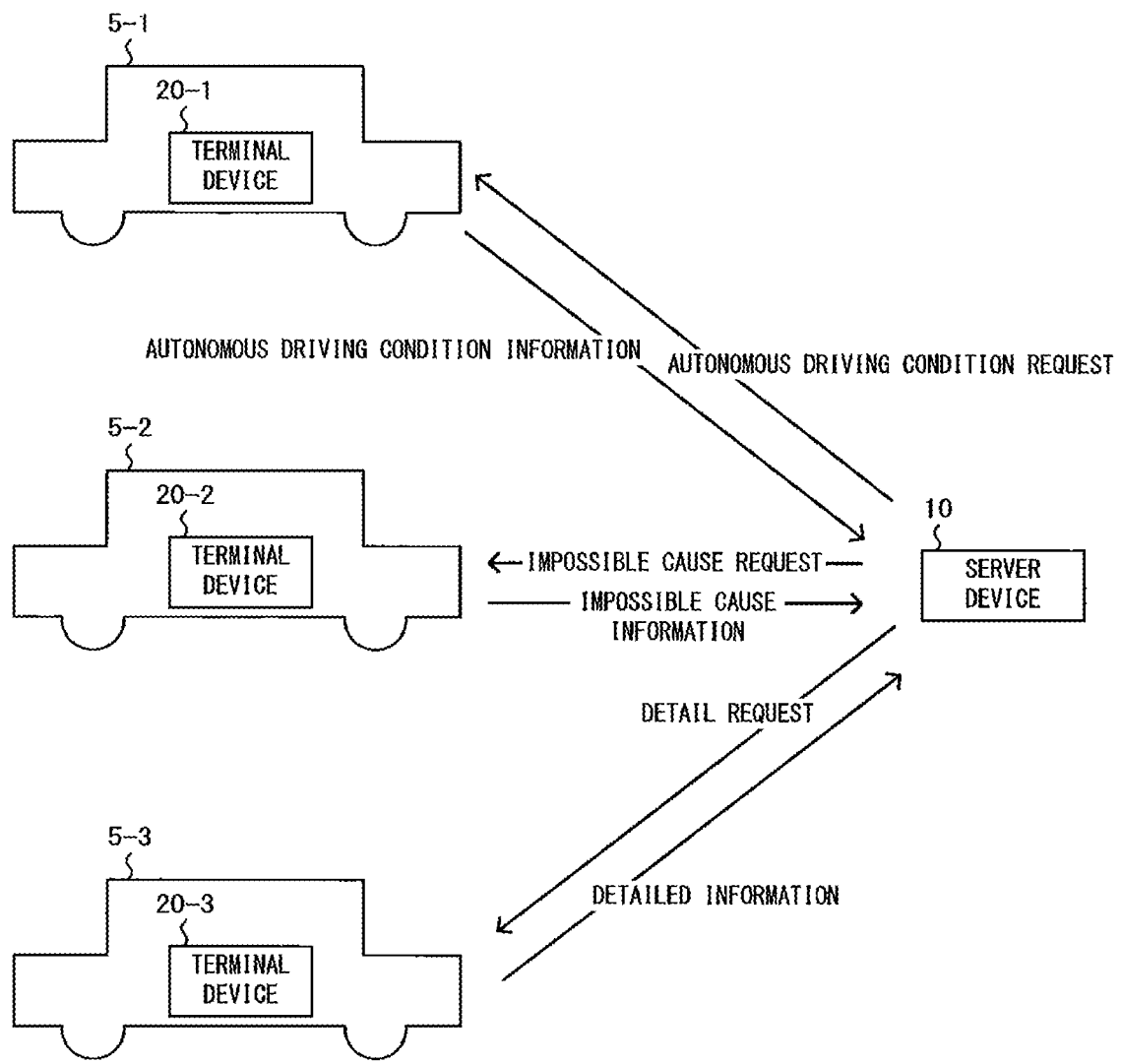
FIG. 4 is a diagram illustrating an example of transmission and reception of information on autonomous driving according to the example.

Next, specific examples corresponding to the above-described embodiment will be described with reference to FIGS. 2 to 5. The examples described below are examples in the case where the embodiment is applied to a server device capable of communicating with a plurality of vehicles. FIG. 2 is a block diagram illustrating an example of a schematic configuration of a communication system according to an example. FIG. 3A is a block diagram illustrating an example of a schematic configuration of a server device according to the example. FIG. 3B is a block diagram illustrating an example of a schematic configuration of a terminal device according to the example. FIG. 4 is a diagram illustrating an example of transmission and reception of information on autonomous driving according the example. FIG. 5A is a flowchart illustrating an example of information reception processing according to the example. FIG. 5B is a flowchart illustrating an example of autonomous driving condition information transmission processing according to the example. FIG. 5C is a flowchart illustrating an example of impossible cause information transmission processing according to the example. FIG. 5D is a flowchart illustrating an example of detailed information transmission processing according to the example.

As illustrated in FIG. 2, a communication system S according to the example includes a server device 10 and a plurality of terminal devices 20. The server device 10 and each terminal device 20 can communicate via a network 7. The network 7 may be, for example, the Internet. Each terminal device 20 is put in a vehicle 5. Each vehicle is capable of autonomous driving based on the state of the surrounding area of the vehicle 5 and a map.

As illustrated in FIG. 3A, the server device 10 includes a control unit 11, a storage unit 12, and a communication unit 13. The control unit 11 to the communication unit 13 are connected via a bus 14. The combination of the control unit 11 and the communication unit 13 is an example of the condition reception unit 1a and the request unit 1b according to the embodiment.

The control unit 11 includes a central processing unit (CPU), a read only memory (ROM), a random access memory (RAM), and the like. The control unit 11 controls the server device 10 by the CPU reading and executing various programs stored in the ROM and the storage unit 12. Furthermore, the control unit 11 acquires information related to the autonomous driving of the vehicle 5 from each of the terminal devices 20 via the communication unit 13 in order to update the map data. Specific description on acquisition of the information on the autonomous driving will be described later.

The storage unit 12 includes, for example, a non-volatile memory such as a hard disk. The storage unit 12 stores various programs for controlling the server device 10. The various programs may be read from a recording medium via, for example, a drive device (not illustrated), or may be downloaded from a predetermined server device via the network 7.

Furthermore, map data for autonomous driving of the vehicles 5 is stored in the storage unit 12. The map data represents in three dimensions places where the vehicles can run and a state of surrounding areas thereof. For example, the map data may be a grid map, such as NDT or OGM, which represents the places where the vehicles can run and the state of the surrounding areas thereof, by a plurality of voxels. In order to generate the map data, for example, a dedicated vehicle (not illustrated) equipped with a peripheral sensor that detects a state of surrounding areas such as LIDAR may run. Based on, for example, a position of the dedicated vehicle, the peripheral sensor collects point cloud data indicating, by positions of a plurality of points, shapes and relative positions of obstacles such as ground objects present in a surrounding area of the dedicated vehicle at the time of running. Absolute positions (for example, longitude, latitude and altitude, or the like) of the point cloud are calculated based on the point cloud data and the position of the dedicated vehicle at the time of the collection. A space in the map is divided into a plurality of grid-aligned voxels, and information such as a three-dimensional normal distribution showing the distribution of points in each voxel, or occupancy probability of an obstacle in each voxel is calculated as a voxel value based on the absolute positions of the point cloud. Map data including such voxel values is generated. The server device 10 transmits part or all of the map data stored in the storage unit 12 to the vehicle 5 as necessary. Note that a plurality of types of map data may be stored in the storage unit 12. For example, map data representing positions or display content of signals, road signs, or the like, map data representing obstacles in surrounding areas of roads, map data representing surfaces, or the like may be stored. Furthermore, a plurality of pieces of map data may be stored in the storage unit 12 according to types of the vehicles and the like.

Moreover, the storage unit 12 may store vehicle type information indicating vehicle types of the vehicles 5, position information (for example, longitude, latitude and altitude, or the like) indicating positions of the vehicles 5, or the like in association with vehicle identification information (for example, chassis numbers, registration numbers or the like) for identifying each vehicle 5. For example, vehicle identification information and position information of the vehicle 5 are transmitted to the server device 10 from each vehicle 5 regularly, irregularly or at a predetermined timing. The server device 10 updates the map data stored in the storage unit 12 in response to the reception of these pieces of information.

The communication unit 13 controls communication with each of the terminal devices 20.

The terminal device 20 is capable of wireless communication and can be connected to the network 7 via a base station (not illustrated). The terminal device 20 is a device for transmitting to the server device 10 information related to autonomous driving of a vehicle 5 equipped with this terminal device 20. Furthermore, the terminal device 20 also controls the autonomous driving of the vehicle 5. Note that the terminal device 20 may be connected to a control device such as an electronic control unit (ECU) that controls the autonomous driving to acquire information related to the autonomous driving from this control device, instead of the terminal device 20 itself performing autonomous driving control.

As illustrated in FIG. 3B, the terminal device 20 includes a control unit 21, a storage unit 22, a communication unit 23, and an interface unit 24. The control unit 21 to the interface unit 24 are connected via a bus 25.

The control unit 21 includes a CPU, a ROM, a RAM, and the like. The CPU reads and executes various programs stored in the ROM and the storage unit 22 so that the control unit 21 controls the terminal device 20.

The storage unit 22 includes a non-volatile memory such as a hard disk or a flash memory. The storage unit 22 stores various programs for controlling the terminal device 20. The various programs may be read from a recording medium via, for example, a drive device (not illustrated), or may be downloaded from the server device 10 or the like via a network such as a wireless communication network.

Furthermore, the storage unit 22 also stores map data. For example, the control unit 21 receives all or part of map data stored in the server device 10 from the server device 10 as necessary, and updates the map data stored in the storage unit 22 with the received data. As in the case of the map data stored in the server device 10, a plurality of types of map data may be stored in the storage unit 22.

The communication unit 23 controls communication with the server device 10.

The interface unit 24 is connected to a peripheral sensor 31 mounted on the vehicle 5, a global navigation satellite system (GNSS) sensor 32, an inertial sensor 33, a vehicle speed sensor 34, and an ECU group 35. The interface unit 24 performs interface processing between the terminal device 20 and the peripheral sensor 31 to the ECU group 35.

The peripheral sensor 31 detects the state of the surrounding area of the vehicle 5. For example, the peripheral sensor 31 may be a sensor that detects distances and directions from the vehicle 5 of obstacles such as ground objects or persons present in the surrounding area of the vehicle 5, and outputs, to the interface unit 24, point cloud data indicating, by positions of a plurality of points, shape and relative position of the obstacles based on a position of the vehicle 5. For example, LIDAR or the like may be used. Alternatively, the peripheral sensor 31 may be equipped with a camera that captures the state of the surrounding area of the vehicle 5 in addition to the sensor that outputs point cloud data. In this case, the peripheral sensor 31 further outputs an image representing the state of the surrounding area of the vehicle 5.

The GNSS sensor 32 receives signals transmitted from GPS satellites (not illustrated), calculates the position of the vehicle 5 based on these signals, and outputs position information (for example, longitude, latitude and altitude, or the like) indicating the calculated position to the interface unit 24.

The inertial sensor 33 detects the acceleration or angular velocity of the vehicle 5, and outputs information thereon to the interface unit 24.

The vehicle speed sensor 34 detects the running speed of the vehicle 5 and outputs information indicating the detected speed to the interface unit 24.

The ECU group 35 includes a plurality of ECUs that control the operation of the vehicle 5. Examples of such an ECU include an ECU that controls an accelerator, an ECU that controls a steering, an ECU that controls a brake, an ECU that controls an engine, and the like.

The control unit 21 controls the autonomous driving of the vehicle 5 equipped with the terminal device 20 including this control unit 21. For example, the control unit 21 estimates the approximate current position of the vehicle 5 by correcting the position information output from the GNSS sensor 32 based on the information output from the inertial sensor 33 and the vehicle speed sensor 34. The control unit 21 compares the point cloud data output from the peripheral sensor 31 with the approximate current position of the vehicle 5 and data of the surrounding area of the approximate current position, in the map data stored in the storage unit 22, to estimate a position at which a matching rate with the actual surrounding a state of the vehicle 5 is high as a more accurate current position of the vehicle 5. The control unit 21 sets the matching rate at this time as the estimation accuracy of the current position of the vehicle 5. When the estimation accuracy is less than a predetermined value, the control unit 21 determines that it is a condition in which the autonomous driving is impossible. Furthermore, for example, when there is a difference in the presence or absence of a predetermined ground object between the point cloud data and the map data (for example, there is a signal on the map but there is actually no signal, there is a difference in display of the sign, or the like), the control unit 21 may determine that it is the condition in which the autonomous driving is impossible. Furthermore, when an error between the current position estimated based on the point cloud data and the map data and the current position estimated based on the information output from the inertial sensor 33 and the vehicle speed sensor 34 is a predetermined value or more, the control unit 21 may determine that it is the condition in which the autonomous driving is impossible. Furthermore, for example, when the peripheral sensor 31 detects that another vehicle, a person or the like suddenly appears in front of the vehicle 5, the control unit 21 may stop the vehicle 5 and determine that it is the condition in which the autonomous driving is impossible. Alternatively, when information indicating that a disaster, an accident, or the like has occurred at the place where the vehicle is located or in the vicinity thereof is received via the communication unit 23, the control unit 21 may stop the vehicle 5 and determine that it is the condition in which the autonomous driving is impossible. When the control unit 21 determines that it is a condition in which the autonomous driving is possible, the control unit 21 transmits control signals to the ECU group 35 to control each unit of the vehicle 5 to perform the autonomous driving. However, for example, when the driver selects to drive the vehicle 5 by himself/herself, the control unit 21 stops the autonomous driving of the vehicle 5.

The control unit 21 transmits, to the server device 10 via the communication unit 23, information on the autonomous driving of the vehicle 5 equipped with the terminal device 20 including the control unit 21. Examples of information related to the autonomous driving include autonomous driving condition information, impossible cause information, and detailed information, and the amount of information is smaller in the order of the autonomous driving condition information, impossible cause information, and detailed information.

The autonomous driving condition information indicates the condition of the autonomous driving of the vehicle 5. The autonomous driving condition information includes at least autonomous driving possible/impossible information. The autonomous driving condition information may further include autonomous driving execution information, position information of the vehicle 5, a running level, and the like. The autonomous driving execution information indicates whether the vehicle 5 has actually executed autonomous driving at a certain time or period. The autonomous driving possible/impossible information indicates whether it is a condition in which the autonomous driving is possible at the certain time or period described above. Only when it is the condition in which autonomous driving is possible, execution of autonomous driving is actually permitted. As described above, even when it is a condition in which the autonomous driving is possible, the autonomous driving is not necessarily actually performed. The autonomous driving possible/impossible information is used by the server device 10 to control the transmission of impossible cause request or detail request described later. The position information indicates the position of a point or route at which the vehicle 5 has stopped or run at the certain time or period described above. The running level indicates a ratio of a speed when the vehicle actually runs to a recommended running speed at the point or route where the vehicle 5 runs. Even in a condition where the autonomous driving is possible, if the estimation accuracy of the current position of the vehicle 5 is relatively low, the vehicle 5 has to run at a lower speed than the recommended speed in some cases. The control unit 21 transmits the autonomous driving condition information in response to receiving autonomous driving condition request from the server device 10. Note that the control unit 21 may transmit the autonomous driving condition request to the server device 10 regularly, irregularly, or at a predetermined timing even without receiving the autonomous driving condition request.

Impossible cause information indicates a cause for which the autonomous driving is impossible when it is a condition in which the autonomous driving is impossible. The impossible cause information may include, for example, reason information, the estimation accuracy of the position of the vehicle 5, position information indicating a position of a point where there is a difference equal to or greater than a predetermined reference between the point cloud data and the map data, information indicating a type of map data having the difference equal to or greater than the predetermined reference, the position information on the vehicle 5, and the like. The reason information indicates the reason for which it is the condition in which the autonomous driving is impossible. The reason information is used to control the transmission of the detail request by the server device, described later. Examples of the reason include (1) lower estimation accuracy of the position of the vehicle 5, (2) existence of a difference in the presence or absence of a predetermined ground object, or the like, between the point cloud data and the map data, (3) larger error between the current position estimated based on the point cloud data and the map data and the current position estimated based on the information output from the inertial sensor 33 and the vehicle speed sensor 34, (4) sudden a state of another vehicle, a person or the like in front of the vehicle 5, (5) occurrence of a disaster or accident, (6) difference in a position or the like of a ground object recognized based on an image and a position or the like of the ground object defined by map data in a case where the ground object is recognized by image recognition from the image photographed by the camera provided in the vehicle 5, (7) existence of a difference between an attribute of a ground object recognized based on the point cloud data or the image and an attribute of the ground object defined by map data, and the like. Existence of the difference in the attribute of the ground object indicates that, although there is no difference in the presence or absence and the position of the ground object, but there is a difference in any attribute of the ground object. For example, when the ground object is a sign, there is a case where there is a difference between contents displayed in the sign recognized from the image photographed by the camera provided in the vehicle 5 and contents displayed in the sign shown in the map data. The attribute in this case is the displayed content. Furthermore, for example, there is a case where, in the case of the point cloud data acquired by LIDAR or the like, there is a difference equal to or greater than a predetermined degree between the value of the reflectance of the ground object obtained by the peripheral sensor 31 receiving the reflected light of the ground object with respect to the laser irradiation from the peripheral sensor 31 of the vehicle 5, and the value of the reflectance of the ground object shown in the map data. The attribute in this case is the reflectance. When it has been a condition in which the autonomous driving is possible, the reason information may indicate that it has been the condition in which the autonomous driving is possible. The control unit 21 transmits the impossible cause information in response to receiving the impossible cause request from the server device 10.

When the reason indicated by the reason information is that the estimation accuracy of the position of the vehicle 5 is low, accuracy information indicating estimation accuracy for each of a plurality of position estimation methods used to estimate the position of the vehicle 5 may be further added to the impossible cause information. Examples of the plurality of position estimation methods include a method using GPS, a method using acceleration, angular velocity, running speed, and the like of the vehicle 5, a method based on positional relationship with surrounding landmarks, and the like. When the reason indicated by the reason information is that there is a difference between the attribute related to the predetermined ground object recognized from the point cloud data acquired by LIDAR or the like or the image photographed by the camera, and the attribute of the ground object defined by the map data, attribute difference information indicating that there is a difference in the attribute of the ground object may be further added to the impossible cause information. This difference information may be information on the attribute having a difference. For example, the attribute difference information may indicate the kind of attribute having the difference. As a result, since it can be known what kind of information is necessary as the detailed information, the server device 10 can appropriately determine a vehicle 5 to which the detail request described later is transmitted. For example, when the attribute difference information indicates that there is a difference in the displayed content of the ground object, the information necessary as the detailed information is an image of the surrounding area of the vehicle 5. Accordingly, the server device 10 may transmit the detail request to a vehicle 5 including the camera as the peripheral sensor 31. When the attribute difference information indicates that there is a difference in the reflectance with respect to the laser irradiation, the information necessary as the detailed information is point cloud data indicating the state of the surrounding area of the vehicle 5. Accordingly, the server device 10 may transmit the detail request to a vehicle 5 in which the peripheral sensor 31 includes a sensor capable of acquiring point cloud data such as LIDAR or the like.

The detailed information indicates the state of the surrounding area of the vehicle 5. The detailed information may include, for example, point cloud data output from the peripheral sensor 31 and the position of the vehicle 5 when the point cloud data is output. In addition to the point cloud data or in place of the point cloud data, the detailed information may include an image indicating the state of the surrounding area of the vehicle 5 photographed by a camera. The detailed information may further include information indicating the model of the peripheral sensor 31, a version of a program for autonomous driving control stored in the storage unit 22 or of the ECU that controls the autonomous driving, a version of map data stored in the storage unit 22, vehicle type information, or the like. The control unit 21 transmits the detailed information in response to receiving the detail request from the server device 10.

Next, acquisition of information related to autonomous driving from the vehicle 5 by the server device 10 will be described. First, the control unit 11 of the server device 10 receives the autonomous driving condition information from the vehicle 5. The vehicle 5 that transmits autonomous driving condition information is referred to as a vehicle 5-1, and the terminal device 20 mounted on the vehicle 5-1 is referred to as a terminal device 20-1. For example, as illustrated in FIG. 4, the control unit 11 transmits the autonomous driving condition request to the vehicle 5-1, and the terminal device 20-1 that has received the autonomous driving condition request transmits the autonomous driving condition information to the server device 10. The control unit 11 may transmit the autonomous driving condition request to only one vehicle 5-1, or may transmit the autonomous driving condition request to a plurality of vehicles 5-1. The control unit 11 may transmit the autonomous driving condition request to all the vehicles 5-1 that the server device 10 can communicate with. Alternatively, the control unit 11 may transmit the autonomous driving condition request to one or a plurality of vehicles 5-1 located in the region selected by the control unit 11 or the manager of the control unit 11 among the plurality of regions. Alternatively, the control unit 11 may transmit the autonomous driving condition request to one or a plurality of vehicles 5-1 located at a point selected by the control unit 11 or the manager.

The control unit 11 transmits the detail request to the vehicle 5 capable of transmitting detailed information indicating the state of the place where the vehicle 5-1 that has transmitted the autonomous driving condition information has run. The detail request may include position information indicating the position of the place where the vehicle 5-1 has run. The place where the vehicle 5-1 has run is a place where driving has been performed in the autonomous driving condition indicated by the autonomous driving condition information transmitted by the vehicle 5-1. This place may be a certain section or point. For example, the road network is divided into a plurality of sections on the map data. The vehicle 5 that receives the detail request is referred to as a vehicle 5-3, and the terminal device 20 mounted on the vehicle 5-3 is referred to as a terminal device 20-3. The control unit 11 may transmit the detail request to only one vehicle 5-3, or may transmit the detail request to a plurality of vehicles 5-3. The terminal device 20-3 that has received the detail request transmits, to the server device 10, detailed information including point cloud data output by the peripheral sensor 31 while the vehicle 5-3 is running in the place where the vehicle 5-1 has run.

The vehicle 5-3 capable of transmitting detailed information indicating the state of the place where the vehicle 5-1 has run may be, for example, a vehicle being running in the place where the vehicle 5-1 has run. Alternatively, the vehicle 5-3 may be a vehicle that is to enter or pass the place where the vehicle 5-1 has run. The vehicle 5-3 may be different from or identical to the vehicle 5-1.

For example, when the vehicle 5-1 runs again in the place where the autonomous driving condition information has been transmitted, the terminal device 20-1 can transmit the detailed information of the place. Furthermore, for example, when the terminal device 20-1 can accumulate point cloud data output from the peripheral sensor 31 in the storage unit 22 for a certain period or for a certain distance, the terminal device 20-1 can transmit the detailed information of the place where the vehicle 5-1 has transmitted the autonomous driving condition information.

When the autonomous driving possible/impossible information included in the autonomous driving condition information transmitted from the vehicle 5-1 indicates that it has been the condition in which the autonomous driving has been possible, the control unit 11 prevents the transmission of the detail request to the vehicle 5-3. In the place where autonomous driving has been possible, it is conceivable that there is no large difference between the point cloud data output by the peripheral sensor 31 and the map data, so that there is less need to update the map data for that place.

When autonomous driving condition information is received from each of a plurality of vehicles 5-1 running in the same place, there is a case where one vehicle 5-1 can perform autonomous driving and another vehicle 5-1 cannot perform autonomous driving. For example, since the performance of autonomous driving differs due to the difference in the vehicle type or the like among the plurality of vehicles 5-1, there is a case where whether autonomous driving is possible or not may differ depending on the vehicle 5-1. In this case, the control unit 11 may determine whether to prevent the autonomous driving condition request by comprehensively considering the conditions of the autonomous driving of the plurality of vehicles 5-1. For example, when a predetermined rate or more of the vehicles 5-1 cannot perform the autonomous driving, the control unit 11 may prevent the autonomous driving condition request.

When the autonomous driving possible/impossible information included in the autonomous driving condition information transmitted from the vehicle 5-1 indicates that it has been the condition in which the autonomous driving has been impossible, the control unit 11 transmits the impossible cause request to the vehicle 5 capable of transmitting the impossible cause information indicating the cause for which the autonomous driving is impossible at the place where the vehicle 5-1 has run. The impossible cause request may include position information indicating the position of the place where the vehicle 5-1 has run. Here, the control unit 11 may request the vehicle 5-1, which has transmitted the autonomous driving condition information, performance information indicating the performance of a sensor or the like mounted on the vehicle 5-1 related to the autonomous driving performance. Examples of a sensor in this case include the peripheral sensor 31, the GNSS 32, the inertial sensor 33, the vehicle speed sensor 34, and the like. Examples of the information indicating the performance of the sensor include a value indicating resolution or sensitivity, a manufacturer who has manufactured the sensor, a model number, a year of manufacture, or the like. The control unit 11 does not have to request the performance information anew for the vehicle 5-1 for which the performance information has already been grasped. When the control unit 11 determines that the performance of the sensor mounted on the vehicle 5-1 is extremely low based on the performance information, the control unit 11 may not transmit the impossible cause request. Furthermore, when determining, using the autonomous driving condition information received from a plurality of vehicles 5-1 running in the same place, whether the autonomous driving is possible at the place, the control unit 11 may determine whether the autonomous driving is possible by lowering the weight on the autonomous driving condition information received from the vehicle 5-1 with very low performance of the included sensor.

The vehicle 5 that receives the impossible cause request is referred to as a vehicle 5-2, and the terminal device 20 mounted on the vehicle 5-2 is referred to as a terminal device 20-2. The control unit 11 may transmit the impossible cause request to only one vehicle 5-2 or may transmit the impossible cause request to the plurality of vehicles 5-2. The terminal device 20-2 that has received the impossible cause request generates the impossible cause information indicating the cause for which the autonomous driving of the vehicle 5-2 is impossible as the cause for which the autonomous driving of the vehicle 5-1 is impossible, based on the determination result as to whether the autonomous driving of the vehicle 5-2 while running in the place where the vehicle 5-1 runs is possible, and transmits the impossible cause information to the server device 10.

The vehicle 5-2 capable of transmitting impossible cause information indicating the cause for which the autonomous driving is impossible in the place where the vehicle 5-1 has run may be, for example, a vehicle being running in the place where the vehicle 5-1 has run. Alternatively, the vehicle 5-2 may be a vehicle that is to enter or pass the place where the vehicle 5-1 has run. The vehicle 5-2 may be different from or identical to the vehicle 5-1.

When the impossible cause information transmitted from the vehicle 5-2 indicates that the cause is existence of a difference between the actual a state of the place where the vehicle 5-1 has moved indicated by the point cloud data output from the peripheral sensor 31, and the map data, the control unit 11 transmits the detail request to the vehicle 5-3. In this case, the vehicle 5-2 and the vehicle 5-3 may be different or identical. A case where there is a difference between the actual a state of the place where the vehicle 5-1 has moved and the map data is, for example, a case where the estimation accuracy of the position of the vehicle 5 is low, a case where there is a difference in the presence or absence of a predetermined ground object or the like between the point cloud data and the map data, a case where the position or the like of the ground object recognized based on the image photographed by the camera mounted on the vehicle 5 and the position or the like of the ground object defined by the map data are different, a case where there is a difference between the attribute of the ground object recognized based on the point cloud data or the image and the attribute of the ground object defined by the map data, or the like. There is a high need to update map data for a place where it is the condition in which autonomous driving has been impossible due to the difference between the point cloud data output by the peripheral sensor 31 and the map data. The cause that there is a difference between the actual a state of the place where the vehicle 5-1 has moved and the map data is simply referred to as a map cause. When the impossible cause information received from the vehicle 5-2 includes the attribute difference information, as described above, the control unit 11 may determine the vehicle 5-3 to which the detail request is to be transmitted based on the attribute difference information.

There is also a case where, although autonomous driving of the vehicle 5-1 has been impossible, autonomous driving of the vehicle 5-2 is possible. The reason is, for example, a case where the condition of the place where the vehicle 5-1 has run may be not preferable only when the vehicle 5-1 has run. Alternatively, the performance of autonomous driving may differ due to the difference in vehicle type or the like between the vehicle 5-1 and the vehicle 5-2. In such a case, the control unit 11 may not transmit the detail request. Alternatively, the vehicle 5-2 may determine the cause for which the autonomous driving is impossible based on the estimation accuracy of the position included in the impossible cause information, and the position information indicating the position of the point at which there is a difference equal to or greater than a predetermined reference between the point cloud data and the map data.

When the impossible cause information is received from each of the plurality of vehicles 5-2 running in the same place, there is a case where a cause for which the autonomous driving of one vehicle 5-2 is impossible is the map cause, and a reason for which the autonomous driving of another vehicle 5-2 is impossible is other than the map cause, for example, a case where the autonomous driving has been impossible because an emergency vehicle such as an ambulance runs nearby. In this case, the control unit 11 may determine whether to transmit the detail request by comprehensively considering causes for which the autonomous driving of the plurality of vehicles 5-2 is impossible.

For example, when a cause for which the autonomous driving of a predetermined rate or more of the vehicle 5-2 is impossible is the map cause, the control unit 11 may transmit the detail request.

The control unit 11 may transmit the autonomous driving condition request, the impossible cause request, and the detail request to each vehicle 5 in units of sections. That is, the vehicle 5-1 transmits the autonomous driving condition information indicating the condition of autonomous driving in the section where the vehicle 5-1 has run, the vehicle 5-2 transmits the impossible cause information indicating the cause for which the autonomous driving in the section where the vehicle 5-1 has run is impossible, and the vehicle 5-3 transmits the detailed information indicating the state of the surrounding area of the section where the vehicle 5-1 has run. However, for the detailed information, the control unit 11 may cause the vehicle 5-3 to transmit the detailed information indicating the state of only one or a plurality of points where there is a difference equal to or greater than a predetermined reference between the point cloud data and the map data in the section that the vehicle 5-1 has run. In this case, the control unit 11 transmits a detail request including position information of the one or plurality of points where there is a difference equal to or greater than a predetermined reference. The vehicle 5-3 transmits detailed information including point cloud data only for the one or plurality of point indicated by the position information included in the detail request in the section where the vehicle 5-1 has run. This reduces the communication load of detailed information.

When receiving the detailed information, the control unit 11 may update the map data stored in the storage unit 12 based on the detailed information. For example, the control unit 11 may compare the point cloud data included in the detailed information with the data of the place where the vehicle 5 has run and the peripheral thereof in the map data to specify the point where there is a difference equal to or greater than a predetermined reference between the point cloud data and the map data. The control unit 11 may update the value of the voxel corresponding to the specified point in the map data with the value of the voxel calculated based on the point cloud data. When the detailed information includes point cloud data only for a point where there is a difference equal to or greater than a predetermined reference, the control unit 11 may update the voxel value corresponding to the point in the map data, to the voxel value calculated based on the point cloud data. Alternatively, also on the side of the server device 10, the point cloud data and the map data may be compared, and the map data may be updated only when there is a difference equal to or greater than a predetermined reference at that point. When receiving the detailed information from each of the plurality of vehicles 5-3 for the same place, the control unit 11 may comprehensively determine whether or not to update the map data for the place based on these pieces of detailed information. Furthermore, the control unit 11 may update the map data using a plurality of pieces of detailed information.

Instead of the server device 10 automatically updating the map data, a manager may update the map data. For example, the manager may update the map data based on point cloud data or an image included in the detailed information. Furthermore, for example, the manager can know that there is a case where a difference may occur in a specific peripheral sensor 31, a program or map data for the vehicle type based on information indicating the model of the peripheral sensor 31, a version of a program for autonomous driving control, a version of map data, vehicle type information, or the like included in the detailed information.

Next, processing examples executed by the server device 10 and the terminal device 20 will be described with reference to FIGS. 5A to 5D. FIG. 5A illustrates processing executed by the server device 10. FIGS. 5B to 5D illustrate processing executed by the terminal device 20.

As illustrated in FIG. 5A, for example, the control unit 11 of the server device 10 selects a vehicle 5-1 that satisfies a predetermined condition from among the plurality of vehicles 5, and transmits the autonomous driving condition request to the vehicle 5-1 (step S1).

The control unit 21 of the terminal device 20-1 mounted on the vehicle 5-1 d receives the autonomous driving condition request to execute autonomous driving condition information transmission processing illustrated in FIG. 5B. The control unit 21 acquires the autonomous driving condition information on the place where the vehicle 5-1 is currently running, transmits the autonomous driving condition information to the server device 10 (step S11), and ends the autonomous driving condition information transmission processing.

When receiving the autonomous driving condition information from the vehicle 5-1 (step S2), the control unit 11 of the server device 10 determines whether the autonomous driving possible/impossible information included in the autonomous driving condition information indicates that it has been a condition where the autonomous driving has been impossible (step S3). At this time, when the control unit 11 determines that it has been a condition where the autonomous driving has been impossible (step S3: YES), the process proceeds to step S4. On the other hand, when the control unit 11 determines that it has not been the condition where the autonomous driving has been impossible (step S3: NO), the information reception process is ended.

In step S4, the control unit 11 specifies a vehicle 5 running in the same place as the place where the vehicle 5-1 has run as the vehicle 5-2 based on the position information of vehicles 5 stored in the storage unit 12. The control unit 11 transmits the impossible cause request to the vehicle 5-2.

The control unit 21 of the terminal device 20-2 mounted on the vehicle 5-2 receives the impossible cause request to execute impossible cause information transmission processing illustrated in FIG. 5C. The control unit 21 determines whether autonomous driving is possible at a place where the vehicle 5-2 is currently running, and generates impossible cause information based on the determination result. The control unit 21 transmits the impossible cause information to the server device 10 (step S12), and the impossible cause information transmission processing is ended.

When receiving the impossible cause information from the vehicle 5-2 (step S5), the control unit 11 of the server device 10 determines whether the impossible cause information indicates that the cause for which the autonomous driving has been impossible is the map cause (step S6). At this time, when the control unit 11 determines that the cause for which the autonomous driving has been impossible is the map cause (YES in step S6), the process proceeds to step S7. On the other hand, when the control unit 11 determines that the cause for which the autonomous driving has been impossible is not the map cause (step S6: NO), the information reception processing is ended.

In step S7, the control unit 11 specifies the vehicle 5 running in the same place as the place where the vehicle 5-1 has run as the vehicle 5-3 based on the position information of the vehicles 5 stored in the storage unit 12. The control unit 11 transmits the detail request to the vehicle 5-3.

The control unit 21 of the terminal device 20-3 mounted on the vehicle 5-3 has receives the detail request to execute detailed information transmission processing illustrated in FIG. 5D. The control unit 21 generates detailed information including point cloud data output from the peripheral sensor 31 regarding a place where the vehicle 5-3 is currently running. The control unit 21 transmits the detailed information to the server device 10 (step S13), and the detailed information transmission processing is ended.

When receiving the detailed information from the vehicle 5-3 (step S8), the control unit 11 of the server device 10 updates the map data stored in the storage unit 12 based on the detailed information (step S9), and the information reception processing is ended.

As described above, according to the operation of the server device 10 according to the example, the autonomous driving condition information indicating the condition of the autonomous driving is received from the vehicle 5-1 capable of the autonomous driving based on the state of the surrounding area of the vehicle 5-1 and the map, a detail request is transmitted to the vehicle 5-3 capable of transmitting the detailed information indicating the state of the place where the vehicle 5-1 has moved, and when the received autonomous driving condition information indicates that the autonomous driving has been possible, transmission of the detail request is prevented. Accordingly, since the transmission of detailed information unnecessary for updating map data is prevented, the server device 10 can efficiently acquire the information of the surrounding area of the vehicle 5 for updating map data while suppressing communication load.

Furthermore, in the case in which the impossible cause request is transmitted to the vehicle 5-2 capable of autonomous driving based on the state of the surrounding area of the vehicle 5-2 and the map when the received autonomous driving condition information indicates that the autonomous driving has been impossible, the impossible cause information is received from the vehicle 5-2, and the detail request is transmitted when the received impossible cause information indicates a difference between the state of the place where the vehicle 5-1 has moved and the map; the transmission of the detailed information unnecessary for updating the map data is further prevented and therefore the server device 10 can efficiently acquire information of the surrounding area of the vehicle 5 for updating the map data while further suppressing the communication load.

Furthermore, in the case in which the impossible cause information includes position information indicating a position of a point where there is a difference equal to or greater than a predetermined value between the state of the place where the vehicle 5-1 has moved and the map in the place where the vehicle 5-1 has moved, and a detail request for detailed information indicating the state of a point at the position indicated by the position information is transmitted; the transmission of detailed information unnecessary for updating the map data is further prevented and therefore the server device 10 can efficiently acquire information of the surrounding area of the vehicle 5 for updating the map data while further preventing the communication load.

Furthermore, according to the operation of the terminal device according to the example, the autonomous driving condition information indicating the condition of the autonomous driving of the vehicle 5 is acquired, and the acquired autonomous driving condition information is transmitted to the server device 10. Accordingly, when the autonomous driving condition information indicates that the autonomous driving has been possible, since transmission of detailed information is prevented, the server device 10 can efficiently acquire information of the surrounding area of the vehicle 5 for updating map data while suppressing communication load.

Furthermore, in the case in which the vehicle 5-1 that has transmitted to the server device 10 the autonomous driving condition information indicating that the autonomous driving has been impossible among the plurality of vehicles 5 receives the detail request for the detailed information indicating the state of the place where the vehicle has run from the server device 10, and the autonomous driving condition information indicates that the autonomous driving has been possible when transmitting to the server device 10 the detailed information indicating the state of the surrounding area of the vehicle 5-3 in the place where the vehicle 5-1 has moved; the transmission of the detail request is prevented and therefore the server device 10 can efficiently acquire the information of the surrounding area of the vehicle 5 for updating the map data while suppressing the communication load.

Furthermore, in the case in which when the vehicle 5-1 that has transmitted to the server device 10 the autonomous driving condition information indicating that the autonomous driving has been impossible among the plurality of vehicles 5 receives the impossible cause request for the impossible cause information indicating the cause for which the autonomous driving has been impossible from the server device 10, the impossible cause information indicates it is not the map cause when transmitting to the server device 10 the impossible cause information based on the determination result on whether the autonomous driving of the vehicle 5-2 in the place where the vehicle 5-1 has moved is possible; the transmission of the detail request is prevented and therefore the server device 10 can efficiently acquire the information of the surrounding area of the vehicle 5 for updating the map data while further suppressing the communication load.

Furthermore, regarding a ground object present at the place where the vehicle 5-1 has moved, the cause information to which attribute difference information indicating that there is a difference in the attribute of the ground object is added may be transmitted when there is a difference between the attribute of the ground object acquired by a sensor or the like mounted on the vehicle 5-1 and the attribute of the ground object defined by the map data. For example, when the attribute difference information includes information on the attribute having a difference, it is possible to know what type of information is required as the detailed information based on the attribute difference information and therefore the server device 10 can transmit the detail request to the vehicle 5-3 capable of transmitting the necessary information.

Furthermore, in the case in which, in the data structure of the autonomous driving condition information, the autonomous driving condition information includes position information indicating a position where the vehicle 5-1 moves, and autonomous driving possible/impossible information indicating whether autonomous driving has been possible at the position, and the autonomous driving possible/impossible information is used by the server device 10 to control the transmission of the impossible cause request to the vehicle 5-2 capable of transmitting the impossible cause information indicating the cause for which the autonomous driving at the position indicated by the position information has been impossible; it is possible to transmit the impossible cause request to the vehicle 5-2 that moves in the same place as the place where the autonomous driving of the vehicle 5-1 has been impossible, the transmission of impossible cause request unnecessary for the determination of map data update is prevented, and therefore that the server device 10 can efficiently acquire information of the surrounding area of the vehicle 5 for updating the map data while suppressing the communication load.

Furthermore, in the case in which, in the data structure of impossible cause information, the impossible cause information includes (i) reason information indicating the reason for which autonomous driving has been impossible, and (ii) position information indicating a position where there is a difference between the state of the surrounding area of the vehicle 5-2 acquired by a sensor with which the vehicle 5-2, is equipped, and the state indicated by the map data used by the vehicle 5-2 for autonomous driving, and the reason information is used by the server device 10 to control the transmission of the detail request to the vehicle 5-3 capable of transmitting the detailed information indicating the state of the position indicated by the position information; the detail request can be transmitted to the vehicle 5-3 moving in the same place where the vehicle 5-2 has moved, when the reason for which the autonomous driving has been impossible is the map cause, the transmission of detailed information unnecessary for updating map data is prevented, and therefore the server device 10 can efficiently acquire information of the surrounding area of the vehicle 5 for updating the map data while suppressing the communication load.

[Modification]

When receiving, from the vehicle 5-1, the autonomous driving condition information indicating that the autonomous driving has been impossible, the server device 10 may transmit the detail request to the vehicle 5-3. Also in this case, the server device 10 can efficiently acquire information of the surrounding area of the vehicle 5 for updating map data while suppressing communication load. In this case, the server device 10 may not transmit the impossible cause request.

In the case where the terminal device 20-1 determines that it is a condition where the autonomous driving has been impossible when the terminal device 20-1 mounted on the vehicle 5-1 receives the autonomous driving condition request from the server device 10, the terminal device 20-1 may transmit the autonomous driving condition information indicating that it is a condition where the autonomous driving has been impossible, and the impossible cause information indicating the cause for which the autonomous driving has been impossible to the server device 10 at the same time. The server device 10 that has received the autonomous driving condition information and the impossible cause information transmits the detail request to the vehicle 5-3 only when the impossible cause information indicates that the cause for which the autonomous driving has been impossible is the map cause. In this case, the server device 10 may not transmit the impossible cause request.

Among the plurality of vehicles 5, there may be a vehicle 5 capable of transmitting only one type or two types of information out of the autonomous driving condition information, the impossible cause information, and the detailed information. When the vehicle 5 capable of transmitting only the detailed information is present, it is sufficient that this vehicle 5 is equipped with the peripheral sensor 31, and this vehicle 5 may be a vehicle that cannot perform autonomous driving. The storage unit 12 of the server device 10 may store, for example, information indicating the type of information that each vehicle 5 can transmit. The server device 10 transmits a request for the information to the vehicle 5 capable of transmitting the required type of information.

REFERENCE SIGNS LIST

1 Server device
1a Condition reception unit
1b Request unit
10 Server device
11 Control unit
12 Storage unit
13 Communication unit
20 Terminal device
21 Control unit
22 Storage unit
23 Communication unit
24 Interface unit
31 Peripheral sensor

The invention claimed is:

1. A server device comprising:
at least one memory configured to store computer program code;
at least one processor configured to access the at least one memory and operate according to the computer program code, the computer program code comprising:
a condition reception code configured to cause at least one of the at least one processor to receive, from a first movable body included in a plurality of movable bodies each capable of autonomous driving based on a state of a surrounding area of a respective movable body and a map, condition information indicating a condition of the autonomous driving; and
a state request code configured to cause at least one of the at least one processor to transmit, to a second movable body capable of transmitting state information indicating a state of a place where the first movable body has moved, a state request for the state information
wherein, in response to receiving the condition information indicating that the autonomous driving has been possible, the state request code is configured to cause at least one of the at least one processor to prevent the transmission of the state request.

2. The server device according to claim 1, wherein the computer program code further comprises:
a cause request code configured to cause at least one of the at least one processor to, when the received condition information indicates that the autonomous driving has been impossible, transmit a cause request for cause information indicating a cause for which the autonomous driving has been impossible to a third movable body included in the plurality of movable bodies; and
a cause reception code configured to cause at least one of the at least one processor to receive the cause information from the third movable body, and
wherein, when the received cause information indicates that the cause is a difference between the state of the place where the first movable body has moved and the map, the state request code is configured to cause at least one of the at least one processor to transmit the state request.

3. The server device according to claim 2, wherein the cause information includes point information indicating a point, in the place where the first movable body has moved, where there is a difference equal to or greater than a predetermined reference degree between the state of the place where the first movable body has moved and the map, and
wherein the state request code is configured to cause at least one of the at least one processor to transmit a point state request for point state information indicating a state of the point indicated by the point information.

4. The server device according to claim 1, wherein the condition reception code is configured to cause at least one of the at least one processor to receive the condition information and cause information indicating a cause for which the autonomous driving has been impossible when the autonomous driving is impossible, and
wherein, when the cause information indicates that the cause is a difference between the state of the place where the first movable body has moved and the map, the state request code is configured to cause at least one of the at least one processor to transmit the state request.

5. A terminal device capable of communicating with the server device according to claim 1, the terminal device being mountable on the first movable body included in the plurality of movable bodies, the terminal device comprising:
at least one terminal memory configured to store a terminal computer program code;
at least one terminal processor configured to access the at least one terminal memory and operate according to the terminal computer program code, the terminal computer program code comprising:
an acquisition code configured to cause at least one of the at least one terminal processor to acquire the condition information indicating the condition of the autonomous driving of the first movable body; and
a condition transmission code configured to cause at least one of the at least one terminal processor to transmit the acquired condition information to the server device.

6. The terminal device according to claim 5, wherein the terminal computer program code further comprises:
a surrounding area request reception code configured to cause at least one of the at least one terminal processor to receive from the server device a second state request for second state information indicating a state of a place where a fourth movable body has moved, the fourth movable body having transmitted to the server device third condition information indicating that the autonomous driving of the fourth movable body is impossible among the plurality of movable bodies; and
a surrounding area transmission code configured to cause at least one of the at least one terminal processor to, when the second state request is received, transmit, to the server device, the second state information indicating a state of a surrounding area of the first movable body in the place where the fourth movable body has moved.

7. A terminal device capable of communicating with the server device according to claim 2, the terminal device being mountable on the third movable body included in the plurality of movable bodies, the terminal device comprising:
at least one terminal memory configured to store a terminal computer program code;
at least one terminal processor configured to access the at least one terminal memory and operate according to the terminal computer program code, the terminal computer program code comprising:
a cause request reception code configured to cause at least one of the at least one terminal processor to receive from the server device the cause request for the cause information indicating the cause for which the autonomous driving of the first movable body has been impossible, the first movable body having transmitted to the server device the condition information indicating that the autonomous driving has been impossible; and a cause transmission code configured to cause at least one of the at least one terminal processor to, when the cause request is received, transmit the cause information to the server device based on a determination result of whether the autonomous driving of the third movable body in the place where the first movable body has moved is possible.

8. The terminal device according to claim 7, wherein the terminal computer program code further comprises:
an acquisition code configured to cause at least one of the at least one terminal processor to acquire second condition information indicating a condition of the autonomous driving of the third movable body; and
a condition transmission code configured to cause at least one of the at least one terminal processor to transmit the acquired second condition information to the server device.

9. The terminal device according to claim 7, wherein, when there is a difference between an attribute of a ground object present at the place where the first movable body has moved and an attribute of the ground object indicated by the map, the cause transmission code is configured to cause at least one of the at least one terminal processor to transmit the cause information to which difference information indicating that there is the difference in the attribute of the ground object is added.

10. The terminal device according to claim 9, wherein the difference information includes information on the attribute having the difference.

11. The terminal device according to claim 7, wherein the terminal computer program code further comprises:
a surrounding area request reception code configured to cause at least one of the at least one terminal processor to receive from the server device a second state request for second state information indicating a state of a place where a fourth movable body has moved, the fourth movable body having transmitted to the server device third condition information indicating that the autonomous driving of the fourth movable body is impossible among the plurality of movable bodies; and
a surrounding area transmission code configured to cause at least one of the at least one terminal processor to, when the second state request is received, transmit, to the server device, the second state information indicating a state of a surrounding area of the third movable body in the place where the fourth movable body has moved.

12. An information reception method executed by a computer, the information reception method comprising:
a condition reception step of receiving, from a first movable body capable of autonomous driving based on a state of a surrounding area of the first movable body and a map, condition information indicating a condition of the autonomous driving; and
a request step of transmitting, to a second movable body capable of transmitting state information indicating a state of a place where the first movable body has moved, a state request for the state information, wherein, in response to receiving the condition information indicating that the autonomous driving has been possible, the transmission of the state request is prevented.

13. An information transmission method executed by a computer of a terminal device capable of communicating with the server device according claim 1, the terminal device being mountable on the first movable body included in the plurality of movable bodies, the information transmission method comprising:
an acquisition step of acquiring the condition information indicating the condition of the autonomous driving of the first movable body; and
a condition transmission step of transmitting the acquired condition information to the server device.

14. An information transmission method executed by a computer of a terminal device capable of communicating with the server device according to claim 2, the terminal device being mountable on the third movable body included in the plurality of movable bodies, the information transmission method comprising:
a cause request reception step of receiving from the server device the cause request for the cause information indicating the cause for which the autonomous driving of the first movable body has been impossible, the first movable body having transmitted to the server device the condition information indicating that the autonomous driving has been impossible; and
a cause transmission step of, when the cause request is received, transmitting the cause information to the server device based on a determination result of whether the autonomous driving of the third movable body in the place where the first movable body has moved is possible.

15. A non-transitory computer readable medium storing thereon an information reception program, the information reception program causing a computer to:
receive, from a first movable body capable of autonomous driving based on a state of a surrounding area of the first movable body and a map, condition information indicating a condition of the autonomous driving; and
transmit, to a second movable body capable of transmitting state information indicating a state of a place where the first movable body has moved, a state request for the state information,
wherein, in response to receiving the condition information indicating that the autonomous driving has been possible, the transmission of the state request is prevented.

16. A non-transitory computer readable medium storing thereon an information transmission program executed by a computer of a terminal device capable of communicating with the server device according claim 1, the terminal device being mountable on the first movable body included in the plurality of movable bodies, the information transmission program causing a computer to:
acquire the condition information indicating the condition of the autonomous driving of the first movable body; and
transmit the acquired condition information to the server device.

* * * * *